United States Patent [19]

Gilmore

[11] Patent Number: 5,560,684
[45] Date of Patent: Oct. 1, 1996

[54] INFLATABLE BAG AND TIPPING APPARATUS INCLUDING SAME

[75] Inventor: Duncan B. Gilmore, Samford, Australia

[73] Assignee: XPT Power Industries Pty. Ltd., Queensland, Australia

[21] Appl. No.: 403,715

[22] PCT Filed: Sep. 16, 1993

[86] PCT No.: PCT/AU93/00475

§ 371 Date: Mar. 16, 1995

§ 102(e) Date: Mar. 16, 1995

[87] PCT Pub. No.: WO94/06649

PCT Pub. Date: Mar. 31, 1994

[30] Foreign Application Priority Data

Sep. 16, 1992 [AU] Australia ................. PL4726

[51] Int. Cl.⁶ ........................................ B60P 1/04
[52] U.S. Cl. .................. 298/22 R; 298/21 R; 298/19 B
[58] Field of Search .................. 298/17 R, 19 B, 298/19 V, 22 R, 22 F, 21 R, 21 V

[56] References Cited

U.S. PATENT DOCUMENTS

| | | | |
|---|---|---|---|
| 3,659,899 | 5/1972 | Phillips et al. | 298/22 R |
| 3,784,255 | 1/1974 | Smock | 298/22 R |
| 4,572,579 | 2/1986 | Saito | 298/22 R |
| 5,067,774 | 11/1991 | Trowland | 298/22 R |

FOREIGN PATENT DOCUMENTS

| | | | |
|---|---|---|---|
| 588734 | 12/1989 | Australia . | |
| 1207221 | 12/1965 | Germany | 298/22 R |
| 148633 | 6/1989 | Japan | 298/22 R |
| 161243 | 7/1964 | U.S.S.R. | 298/22 R |
| 2145041 | 3/1985 | United Kingdom | 298/22 R |
| 9011204 | 10/1990 | WIPO . | |

Primary Examiner—Karen B. Merritt
Assistant Examiner—Gregory A. Morse
Attorney, Agent, or Firm—Loeb & Loeb LLP

[57] ABSTRACT

A tipping vehicle has a tipping tray which is pivoted about a hinge by inflation of a flexible gas bag. The bag is constructed in two sections, the lower of which is generally cylindrical with parallel side walls and the upper of which is generally conical with its central axis tilted toward the hinge. The bag may be inflated with vehicle exhaust gasses.

7 Claims, 6 Drawing Sheets

INFLATABLE BAG AND TIPPING APPARATUS INCLUDING SAME

FIELD OF THE INVENTION

THIS INVENTION relates to an inflatable bag which can be positioned between a chassis and a tipping tray (such as on a vehicle or dump bin) and which upon inflation and deflation causes the tipping tray to tip relative to the chassis.

The inflatable bag is considered to be useful as a substitute for known hydraulic or pneumatic cylinders which are currently used to raise or lower a tipping tray.

BACKGROUND ART

Currently, tipping vehicles such as utilities, trucks, trailers, pick-ups, dump bins, style sides and the like are provided with a .hydraulic or pneumatic cylinder which is located generally between the chassis and the tipping platform or tray- Operation of the cylinder causes the tipping tray to pivot between an inclined tipping position and a horizontal rest position. A disadvantage with such cylinders is the relative high cost of installation and the need to provide a separate hydraulic or pneumatic system including pumps, high pressure hoses, tubes and the like.

More recently, inflatable bags have been used to substitute the above known cylinders. The bag is inflatable (usually by air or exhaust gasses) and has a lower end secured relative to the chassis and an upper end which is secured relative to the tipping tray. It is also known to inflate these bags using the exhaust system of the vehicle through a diverter valve in the exhaust system which diverts exhaust air through a suitable hose line into the gas bag.

Such earlier gas bags are disclosed in our earlier Australian patents 579830 and 619811 filed in 1984 and a second type is illustrated in U.S. Pat. No. 5,067,774 to Trowland.

Earlier proposals for gas bags suffer from many disadvantages which to date has made them commercially unattractive, and in practice unsuitable for installation in pick-ups and style sides light trucks.

For instance, for use in commercial utilities, trucks and trailers, it is found that the area available for air bag installation is relatively small. This is because the chassis includes many obstructions which are difficult or uneconomic to re-position including petrol tanks, chassis rails and the like. Furthermore, design rules for vehicle impact constrain the layout of the chassis components. It is found that in practice, the only readily available position is relatively close to the rear hinge point where the tipping tray is hingedly connected to the vehicle chassis.

However, a difficulty in placing an inflatable gas bag close to the pivot point is the larger pressure required to inflate the gas bag and particularly to cause the tip tray to pivot when under load conditions. That is, a general rule of thumb is that the closer the gas bag is to the pivot point, the more pressure is required, the stronger the gas bag material has to be and the more expensive it is to manufacture. This has been a consideration which has deterred many known gas bags from commercialization. However, as discussed above, this is the area of least obstruction and therefore the area where a gas bag can be most easily fitted to a range of vehicles.

Other considerations which hitherto have caused difficulties to existing gas or air bags is the relatively small amount of clearance space available between the tipping tray and the chassis due to the vehicle design. This meant that the gas bag was required to be of relatively small size such that in the collapsed state it could be fitted in this relatively small space, for instance, between the chassis rails.

However, gas bags fitted further away from the hinge point of the tipping tray, are required to be of larger size in order to allow the tray to be tipped to a useful angle which should be 45° or more. Furthermore, at such a tipping angle, the bag should be stable, especially under load conditions, and there should be no tendency to buckle or deform.

Another consideration is the tipping rate, that is the rate at which the tipping tray can be raised or lowered. This is determined by the volume of gases flowing into the bag and the volume of the bag itself. It can be seen that for an acceptable tipping rate, the bag volume should be kept as small as possible and/or the volume of gas flowing into the bag should be increased. The volume of gas can be increased by revving the vehicle engine (if exhaust gases are used), however, this is undesirable in terms of noise pollution. Most operators would like the gas bags to be inflated while the vehicle is idling or at an engine speed slightly above idle. Therefore, the other consideration is to minimize bag volume which in turn teaches away from the use of the bag at a distance from the hinge point which requires larger bag volumes and sizes.

DISCLOSURE OF THE INVENTION

We have now determined that as the tipping tray is lifted there are different forces acting on the bag and tray depending on the angle of tilt. That is, we have found that a gas bag of a single uniform shape when inflated does not optimise the tipping process and requires either increased pressures, increased gas volumes, or increased size and dimensions, all of which are undesirable.

We have now developed an inflatable gas bag having a particular configuration to allow it to optimize the tipping process.

We achieve this by having a bag shaped into two different configurations, being a first configuration optimised for lower tilt angles (i.e., tilt trays being initially tilted) and a second different configuration optimized for larger tilting angles.

We find that our first shape may be optimal for tilt angles between from 0° to about 20° and our second shape may be optimal for tilt angles of between about 20° to about 60° or above. The first configuration is suitably one with a side wall or walls which extend substantially at right angles (when inflated) from the chassis to which the bag can be supported. Such shapes include cylindrical shapes, rectangular shapes, elliptical shapes, polygonal shapes. The second configuration is suitably one having a side wall or side walls which converge relative to each other.

We find that a particularly preferred overall bag shape is one having as its first configuration a generally cylindrical configuration and as its second shape a generally truncated right cone. When inflated, the generally cylindrical shape is typically the lower shape and the generally truncated right cone shape is the upper shape. This configuration provides thrust generally at right angles to the tipping tray irrespective of the tipping angle.

By having a gas bag in at least two different configurations, we can locate the gas bag closer to the hinge point while still allowing it to be inflated with normal pressures and from a vehicle exhaust and we also minimise bag size while still allowing a good tipping angle.

Figure 1:
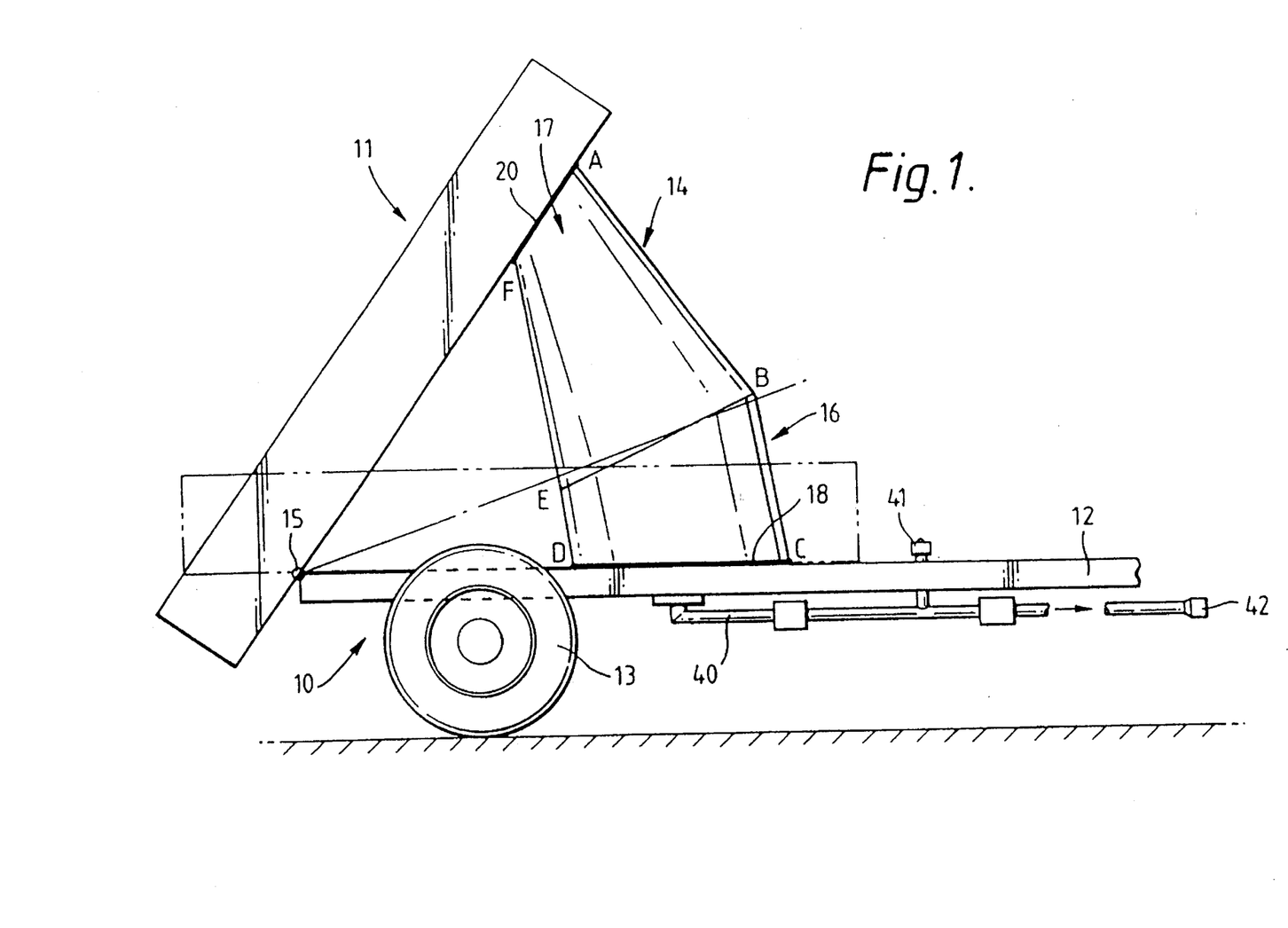
FIG. 1 illustrates diagrammatically a bag according to the invention located in a tipping vehicle.

The generally cylindrical shape of our bag suitably has a lower end face which can be secured relative to the vehicle chassis and is conveniently identified as points D–C in FIG. 1. The cylindrical shape may have an upper end which is slightly elliptical and can conveniently be defined points E–B.

Suitably, the truncated right cone has a lower end which is substantially the same as the upper end of the generally cylindrical shape (E–B) and suitably has an upper end face which may be secured relative to the tipping tray and can conveniently be identified as points F–A.

Suitably, points A, B and C, or the centre of the top or bottom of the bag, are substantially equally spaced from a hinge point when the tipping tray is hinged relative to the chassis.

Suitably length D, E and F is of a length to allow the bag to collapse in a stable manner upon deflation and to minimize buckling.

The bag may be secured to end plates. The end plates may function to support the bag to the tilt tray and chassis and may also function to act as thrust plates.

The bag is suitably inflated by exhaust gases of a vehicle. Alternatively, other sources of inflating media can be used such as compressed air and/or other gases. Suitably, the bag is provided with an inlet which can be connected to the source of inflating media through a suitable conduit. A pressure relief valve may be included to prevent over inflation of the bag.

To deflate the bag, the bag may be provided with an outlet. Suitably, the inlet and outlet are the same, thereby allowing outlet gases to pass through the conduit and through the vehicle exhaust or through a relief valve.

A support assembly may also be provided to prevent falling of the tipping tray or body should the inflatable bag suddenly lose pressure (for instance, by bursting). The support assembly may comprise a member in between the tipping tray and the vehicle chassis and which can move as the tray is lifted but which can support the tray should the bag rupture. The support assembly may also be able to support the tray in the case that the bag exhibits a slow pressure release. Suitably, the support assembly comprises a strut which can be hingedly connected relative to the chassis or tray to move between raised and lowered positions. The strut may have a free end provided with a roller or slide to contact with the tray or chassis. A locking mechanism may be provided to prevent unintentional lowering of the strut.

DESCRIPTION OF THE DRAWINGS

The invention will be described with reference to the following embodiment as illustrated in the accompanying drawings in which.

BEST MODE

Referring to the embodiments, and especially to FIG. 1, there is shown a tipping vehicle 10 having a tipping tray 11 and a vehicle chassis 12 which is supported by a vehicle wheel 13. Between tipping tray 11 and vehicle chassis 12 is provided an gas bag 14 according to the invention. Tipping tray 11 is secured to vehicle chassis 12 by a hinge pin 15.

Gas bag 14 has two distinctly different shapes, being a lower generally truncated cylindrical or elliptic shape 16 conveniently defined by points D, C, B, and E and upper truncated right cone 17 conveniently defined by points E, B, A and F.

Figure 4:
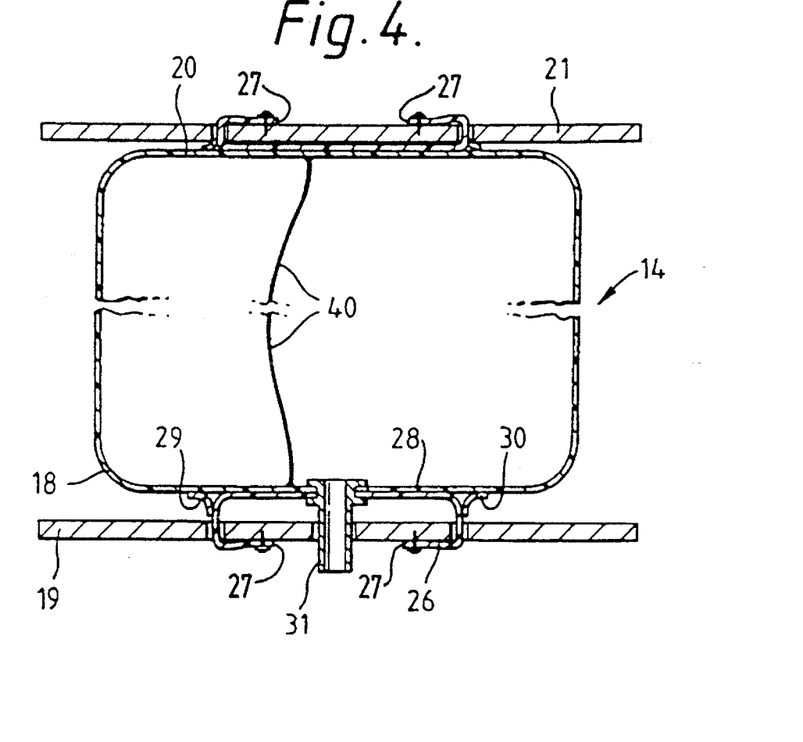
FIG. 4 is an illustration of how the bag can be secured to end plates.

Lower generally cylindrical shape 16 has a lower end face 18 which is attached to an end plate 19 better illustrated in FIG. 4.

Truncated right cone shape 17 has an upper end 20 which is attached to an upper end plate 21 also shown in FIG. 4.

Points A, B and C, or the centre of the top or bottom of the bag, are caused to be equidistant from hinge point 15. Inner length D, E and F is also made slightly longer than required to ensure that the initial gas pressure will always extend the bag outwards in this region thereby achieving a stable collapse of the bag as the tilt angle is reduced. Other arrangements can cause the bag to buckle undesirably.

Corner B, which is a theoretical discontinuity is rounded out when cutting the bag pattern to reduced stress concentration of the inflated bag. This will ensure a longer cycle bag life.

The bag fabric is made from a tough, flexible and airtight material such as a woven polyester fibre-coated with PVC, a reinforced butyl rubber or vinyl and various commercial materials are available.

Figure 2:
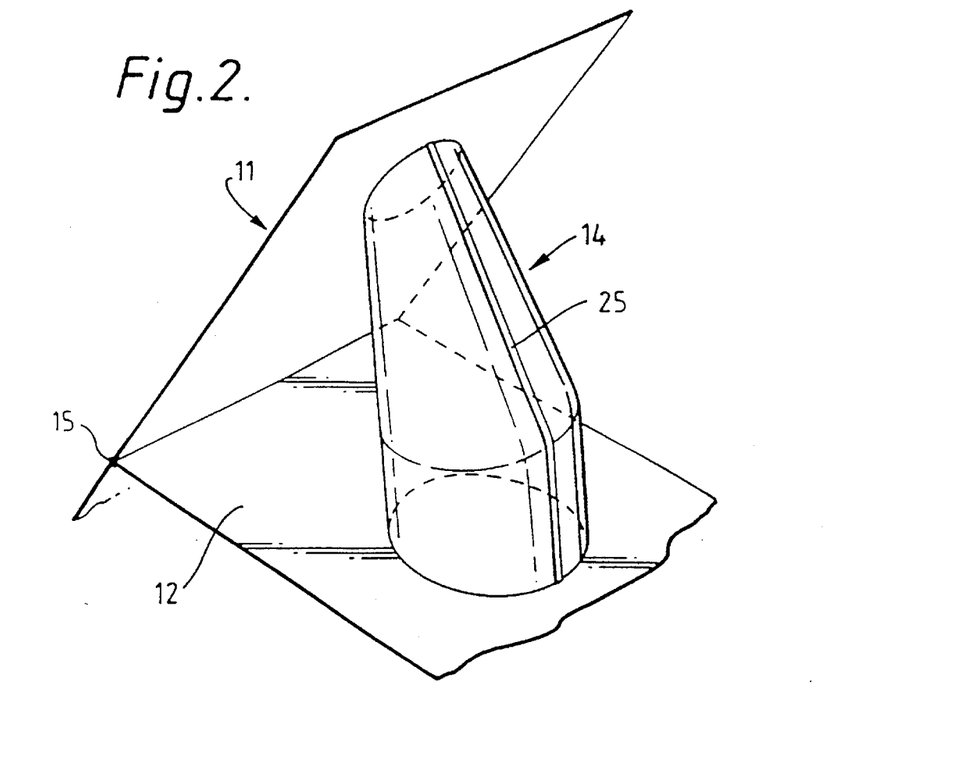
FIG. 2 illustrates a perspective view of the bag of FIG. 1.
Figure 3:
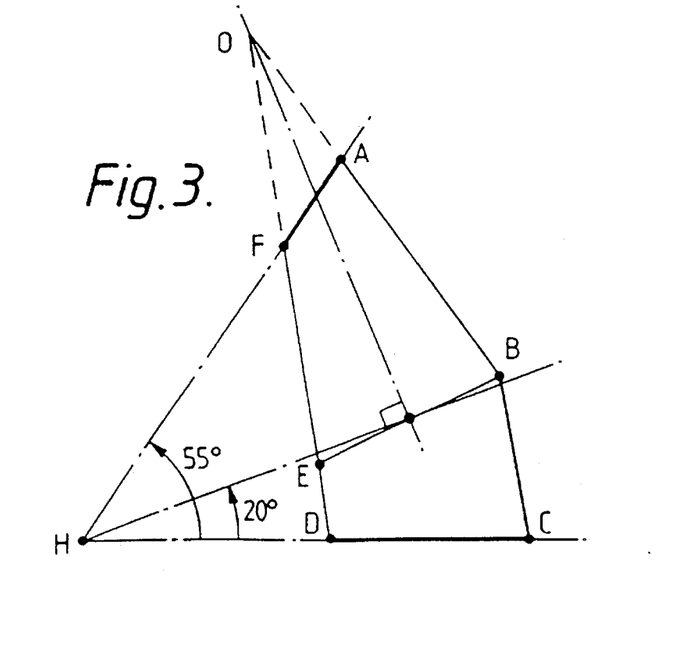
FIG. 3 illustrates a section view of the bag drawn at 55° as an exemplary angle.

Once the bag is sized and cut according to the shape illustrated in FIG. 3, the longitudinal ends can be joined along a seam 25 (see FIG. 2). It can be seen that another advantage of the particular bag shape is its ability to develop a three-dimensional shape of the bag onto a planar fabric which greatly facilitates its manufacture.

Referring now to FIG. 4, there is shown how the gas bag 14 is secured to its respective end plates 19, 21. The end plates also function as thrust plates to cause the resulting tipping action upon inflation or deflation of the bag.

Upper end plate 21 is secured to the underside of tipping tray 11 while lower end plate 19 is secured to a chassis cross-member or a pair of chassis cross-members (not shown). Each end of the bag 18, 20 is connected to a corresponding end plate 19, 21 by a strip 26 of the same material as bag 14. Strip 26 is secured across a major portion of the end of the bag and is folded into a shape of substantially rectangular cross-section with the ends 27 of strip 26 being fastened to the respective end plate. The side 28 of strip 26 opposite the overlapped ends is welded to the adjacent end of the bag and bracing strips 29, 30 are welded at one end to the bag and at the other end to the side of strip 26, at each side of the bag. A similar arrangement is provided on the other end plate. Each of the end plates 19, 21 is slotted to allow the strip to pass through the slot and to be secured to the respective end plate. When bag 14 is inflated, it naturally attempts to assume a rounded end wall shape and if it is allowed to do so, it will tear away from the end plates 19, 21. This tendency is overcome by the various strips which are secured over a relatively large area of each end of the bag and so holds the end square when the bag is inflated, and distribute over the relatively large area the stress of the bag caused by restraining the bag when it is inflated.

The lower end of bag 14 is provided with an inlet 31 in the form of a hose extending through a hole in end plate 19 and is sealed into the end of the bag.

The hose extends along the underside of the vehicle chassis and towards the vehicle exhaust system. If the tipping assembly is a trailer, the hose extends to the exhaust system of the towing vehicle.

The exhaust system of the vehicle 35 (see FIG. 5) is provided with a valve member 36 typically in a form of a 'butterfly' valve which can pivot between open and closed positions through a remote control wire 37 which extends into the vehicle cabin. Thus, when the bag is desired to be inflated, remote control 37 is operated to pivot 'butterfly' valve 36 to the closed position, whereafter exhaust passes through secondary outlet 38 and through a suitable conduit (not shown) into inlet 31 of bag 14. In this manner, the bag may be inflated.

Figure 5:
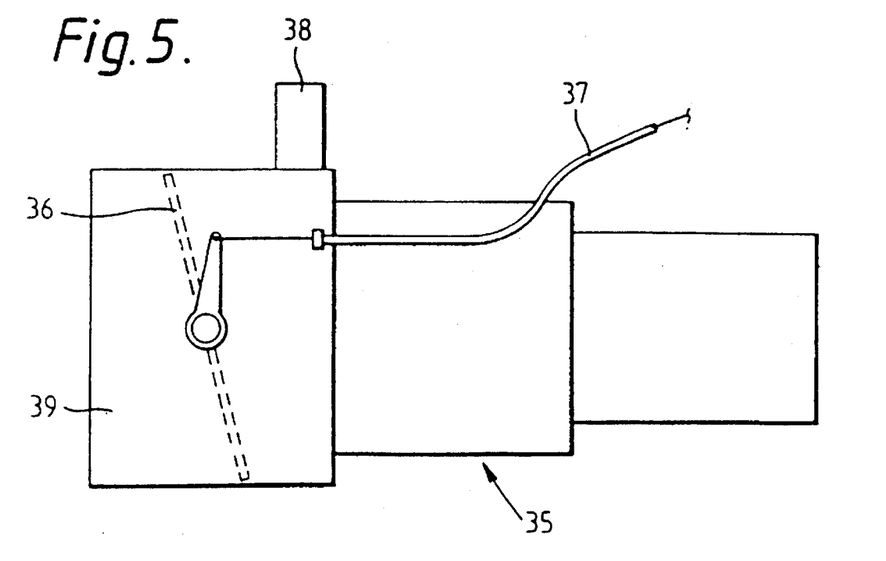
FIG. 5 is an illustration of a vehicle exhaust diverter system to divert exhaust gases to the bag.

When desired to deflate the bag, 'butterfly' valve 36 can be pivoted to its open position and the weight of the empty tipping tray 11 is sufficient to slowly force air from the air bag 14 through inlet 31 and through secondary outlet 38 and out through the exhaust tail pipe 39. In this manner, gases pass only out through the tail pipe upon deflation of the bag.

FIG. 1 shows a tipping trailer which can be towed by a car. In this arrangement the bag 14 is connected to hose 40. Hose 40 includes a relief valve 41 to vent excess pressure to prevent bursting of the bag. The end of hose 40 includes a cone-like coupling 42 which can be fitted over the tail pipe of the car. The coupling 42 can include a clamp or other coupling (not shown) to prevent it from being blown off the tail pipe. This type of coupling device is known.

To prevent over-inflation of the bag, a pressure relief valve 41 may be added thereto with the pressure set to below that of the theoretical tear pressure of the bag. Alternatively, internal connectors 40 (see FIG. 4) may be fitted to prevent over-inflation of the bag.

Figure 6:
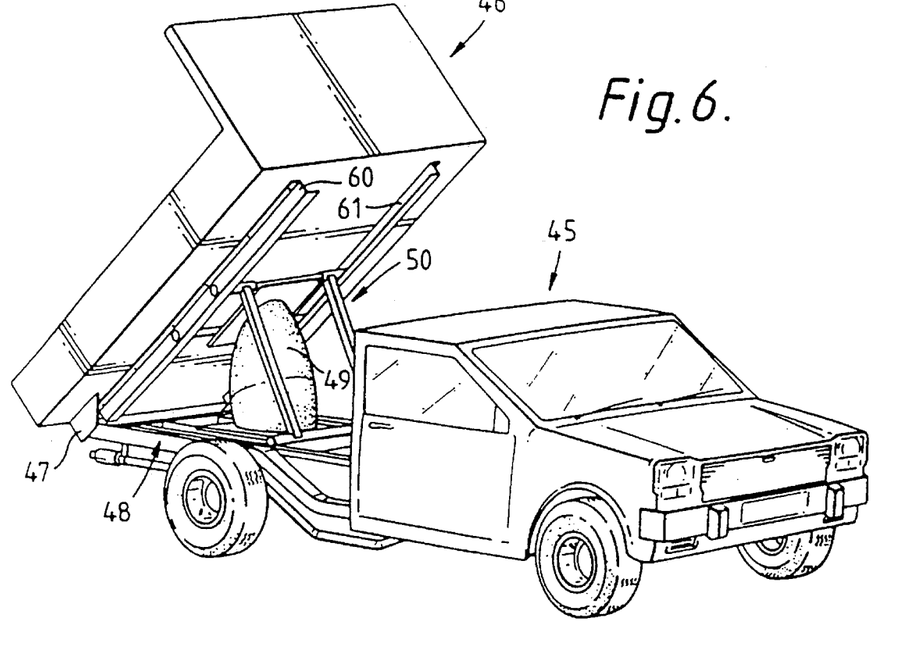
FIGS. 6 and 7 illustrate embodiments of a support assembly.
Figure 7:
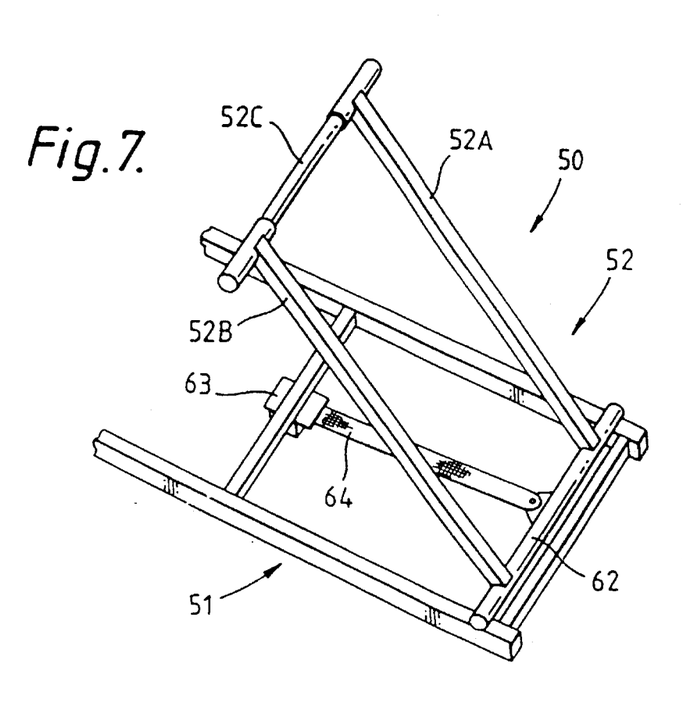

FIGS. 6 and 7 illustrate an embodiment showing a vehicle 45 having a tipping tray 46 attached to the vehicle chassis 48 through pivot pins 47. Chassis 48 supports a gas bag 49 of a design as described above. As well, a support assembly 50 is provided. The support assembly functions to prevent tipping tray 46 from falling down should there by a sudden pressure loss in gas bag 49 (for instance, should the gas bag rupture).

As shown in FIGS. 6 and 7, support assembly 50 comprises a frame assembly having a base frame 51 formed from a pair of longitudinal frame members interconnected by transverse struts, and a pivotal support arm 52 formed from a pair of parallel arm members 52A, 52B. A transverse bar 52C extends across arm members 52A, 52B and has ends pivotally coupled to rails 60, 61 on the bottom of tipping tray 46. A second lower transverse bar 62 extends between the lower ends of arm members 52A, 52B and can slide along base frame 51. An inertia reel seat belt lock assembly 63 is attached to one of the transverse struts of frame 51 and the belt is attached to bar 62. If the inflated bag 49 should fail, tipping tray 46 would suddenly fall down causing bar 62 to suddenly slide along base frame 51 towards the vehicle cabin. The belt lock assembly would lock, causing belt 64 to lock which in turn prevents bar 62 from further movement which in turn causes arm members 52A, 52B to stay upright to support the tray. An advantage of using a seat belt lock is that it will not lock belt 64 if the tray is slowly raised or lowered, but only if there is a sudden movement. Other mechanisms such as a ratchet mechanism can also be used.

Figure 8A:
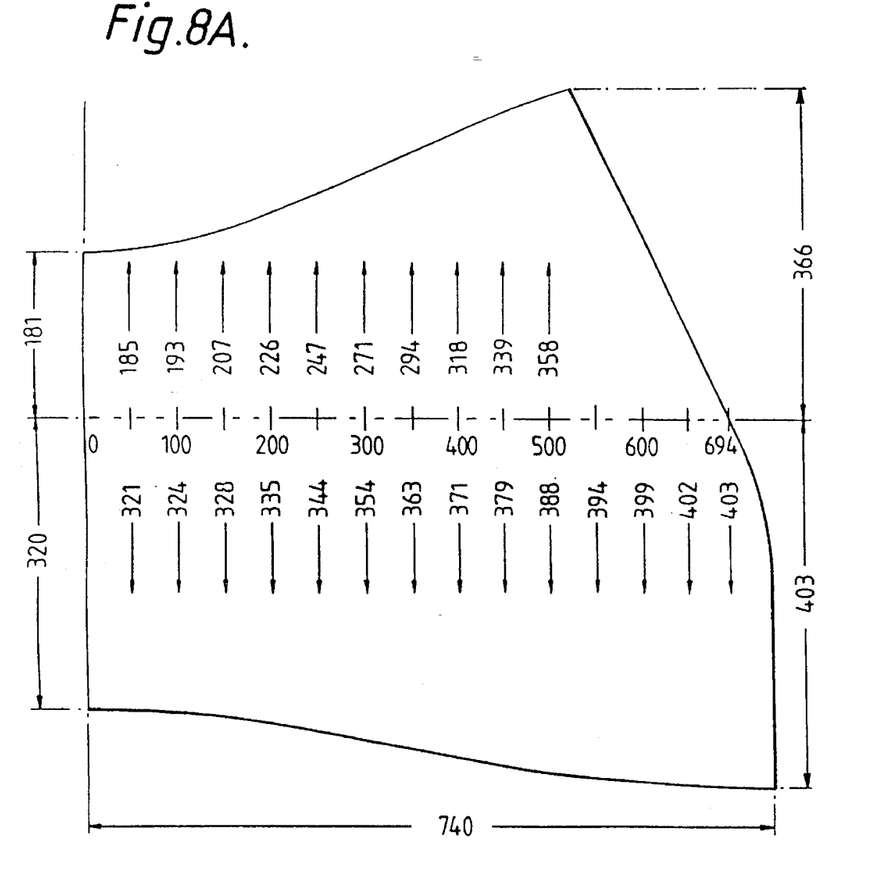
FIG. 8A illustrates a fabric pattern of the inflatable bag.
Figure 8B:
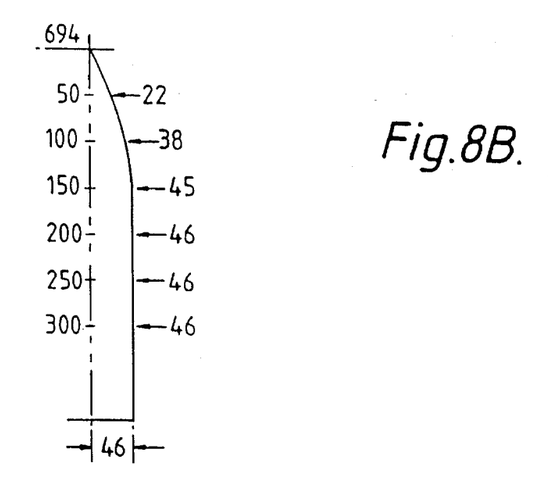
FIG. 8B illustrates a partial view of the top edge of FIG. 8A showing the degree of curvature of the inflatable bag.

FIGS. 8A and 8B illustrate in plan one half of the pattern for the inflatable bag. The pattern is mirrored about the left hand vertical edge to provide a complete shape.

Figure 9:
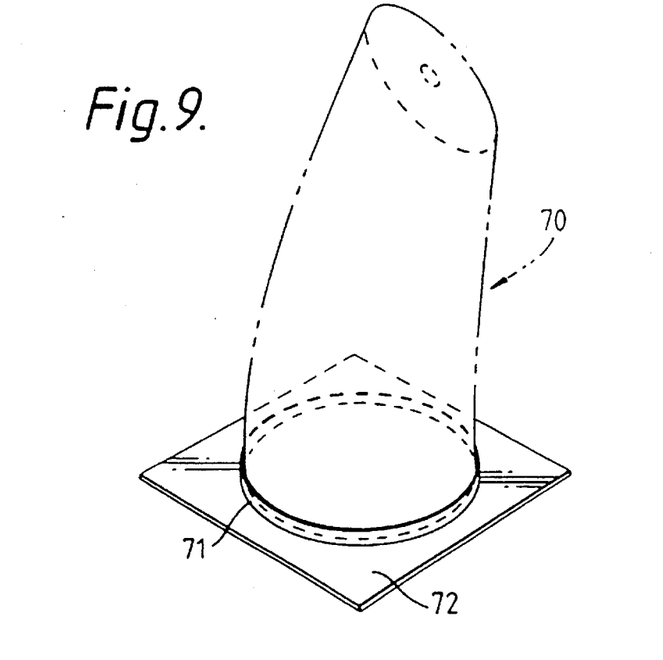
FIG. 9 illustrates a method of attachment of a bag to a support plate.

FIG. 9 shows the air bag 70 according to an embodiment of the invention which is attached to a collar 71 on a lower thrust plate 72. Collar 71 and thrust plate 72 can be integrally formed from plastic. The fabric of air bag 70 is wrapped around the collar 71 and is then welded to it. The welding is performed in a one dimensional plane which will yield additional strength. By selecting the correct plastic, a heat weld can be provided.

Figure 10:
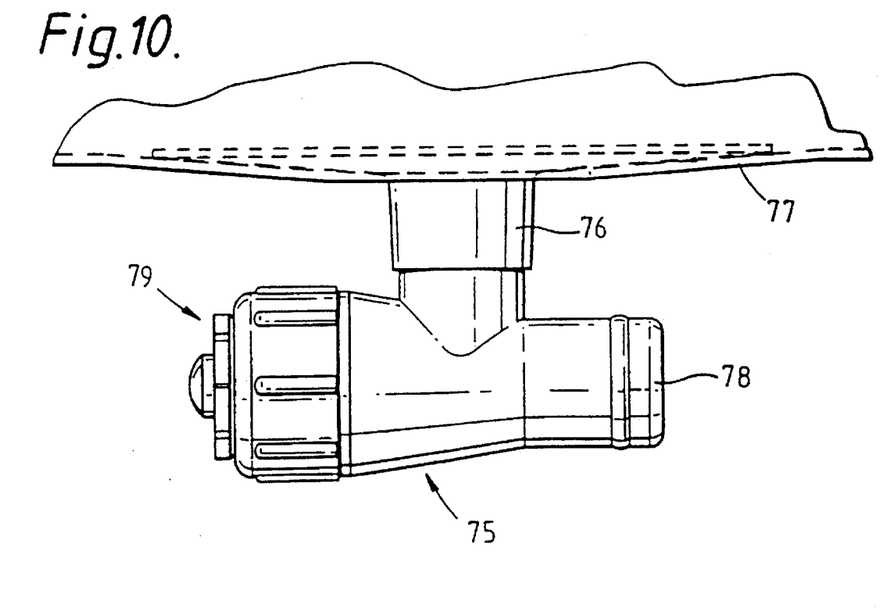
FIG. 10 illustrates a valve for attachment to an inflatable bag.

FIG. 10 illustrates the pressure relief valve 75 which can be integrated into the flange 76 which is heat welded into the base of inflatable bag 77. Inflating exhaust gas enters through the valve and flange through inlet 78 over which a hose (not shown) can be attached to funnel exhaust gas from the exhaust pipe to inlet 78. A valve 79 is provided to allow the pressure to be set, after which excess pressure will pass through valve 79 and be vented to the atmosphere.

The advantages of the bag are many. For instance, the bag has a shape and configuration which will suit commercial vehicles available from original equipment manufacturers. Such vehicles are readily equipped with a rear tilting tray which is hingedly connected to the chassis. Minimal space is available to fit an air bag between the tray and the rails and our air bag being of compact design can be so fitted.

The device is smaller in volume than current devices to enable faster lift times than previous models given a particular exhaust gas flow rate from the engine.

Our shape of the bag is able to lift a rated load of the vehicle with the lowest possible exhaust gas pressure and minimal fabric material and still allows lift angles of 50° or more and typically 51°–55° to be achieved.

The maximum pressure in the bag is limited by safety requirements, the strength of the fabric from which the bag is to be manufactured and is also related to the pressure able to be withstood by vehicle exhaust systems and connecting components and the back pressure applied to the engine during the lifting operation.

The size of the lower and upper portion of the bag are chosen such that the generally cylindrical configuration only is used for tilt angles from 0° to 20° or for tilt angles above 20° inclination occurs primarily through the truncated right cone. Thus, at angles of above about 20°, the lower generally cylindrical configuration should be substantially inflated. By placing points A, B and C equidistant from the hinge ensures that the bag material extends further from the hinge as the tilt angle decreases from approximately 20°. This enables a larger lifting moment than hitherto possible because the bag area is actually larger and placed further away from the hinge at this particular point. This maximizes the load for a given amount of bag material and a given amount of gas pressure.

By having the upper shape truncated and reducing in volume, we find that the gas pressure is constant and, if anything, may decrease as the tilt tray is caused to incline. In previous air bags, there is a requirement to increase the gas pressure upon increased inflation of the bag. This is particularly so in the bag described in U.S. Pat. No. 5,067, 774.

The bag identified in the above patent, when in the collapsed state, offers a relative small area when initially inflated (at low tipping angles) which is contrary to our bag shape.

We find that the bag design has a high lifting capacity for a given exhaust pressure and therefore the bag can be placed closer to the hinge point which allows us to reduce the volume of the bag and reduce the amount of bag material used. Less material means a smaller packing volume when the bag is fully collapsed which also means they can fit into small clearance spaces.

We also find that during deflation of the bag, deflation initially occurs in the top tapering portion which improves the rate of lowering of the tipping tray. Thereafter, we find that the lower generally cylindrical portion begins to deflate which results in a slowing down of the movement of the tipping tray. This in turn prevents the tipping tray from slamming against the vehicle chassis which is an advantageous effect while still allowing an initial fast movement of the tipping tray.

It should be appreciated that various other changes and modifications may be made to the embodiment described without departing from the spirit and scope of the invention.

I claim:

1. An inflatable bag suitable for a dump vehicle, the dump vehicle having a chassis and a tray pivotally connected to the chassis of a pivot point, the inflatable bag comprising:

a first bag portion having a base plate coupled to the chassis and substantially parallel side walls, wherein when the first bag portion is inflated, the tray tilts by about 20 degrees with respect to the chassis;

a second bag portion having a top plate coupled to the tray, the second bag portion being coupled to the first bag portion to define a void, and being configured so that when fully inflated, the second bag portion assumes a oblique cone-like shape on top of the first bag portion the second bag portion having a central axis tilted toward the pivot point to tilt the tray by about 50 degrees with respect to the chassis.

2. The inflatable bag as claimed in claim 1, wherein the first bag portion, when inflated, adopts a generally cylindrical or oval shape.

3. The inflatable bag as claimed in claim 1, wherein the second bag portion, when inflated, adopts a generally truncated cone shape.

4. The inflatable bag as claimed in claim 1, further including a pressure relief valve to prevent over-inflation of the inflatable bag.

5. The inflatable bag as claimed in claim 4, wherein the inflatable bag is inflated by vehicle exhaust gases.

6. An inflatable bag suitable for a dump vehicle, the dump vehicle having a chassis and a tray pivotally connected to the chassis with a hinge, the inflatable bag comprising:

a first bag portion having substantially parallel side walls, an outer surface and an inner wall, wherein the first bag portion is mounted on the chassis;

a second bag portion having an oblique cone shape with a substantially flat apical end and a base, wherein the base is coupled to the first bag portion at an angle so that a central axis of the second bag portion is tilted toward the hinge, the second bag portion defining a first outer surface which is closest to the hinge, the first outer surface forming a substantially straight surface with the outer surface of the first bag portion, and the second bag portion further defining a second outer surface opposite to the first outer surface to form an obtuse angle from the inner wall of the first bag portion to an inner wall of the second outer surface of the second bag portion.

7. The inflatable bag as claimed in claim 6, wherein the first bag portion is connected to a lower end plate, and the second bag portion is connected to an upper end plate, the lower end plate joining the chassis and the upper end plate joining the tray.

* * * * *